(12) United States Patent
Nakatsu

(10) Patent No.: US 10,919,796 B2
(45) Date of Patent: Feb. 16, 2021

(54) METHOD FOR PRODUCING GLASS PLATE

(71) Applicant: Nippon Electric Glass Co., Ltd., Shiga (JP)

(72) Inventor: Hiroyuki Nakatsu, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 16/339,069

(22) PCT Filed: Oct. 5, 2017

(86) PCT No.: PCT/JP2017/036374
§ 371 (c)(1),
(2) Date: Apr. 3, 2019

(87) PCT Pub. No.: WO2018/070345
PCT Pub. Date: Apr. 19, 2018

(65) Prior Publication Data
US 2019/0225529 A1 Jul. 25, 2019

(30) Foreign Application Priority Data

Oct. 14, 2016 (JP) ................................. 2016-202350

(51) Int. Cl.
*C03B 33/04* (2006.01)
*B28D 5/00* (2006.01)
(52) U.S. Cl.
CPC ................ *C03B 33/04* (2013.01); *B28D 5/00* (2013.01)
(58) Field of Classification Search
CPC ....... B28D 5/00; C03B 33/033; C03B 33/037; C03B 33/04
See application file for complete search history.

(56) References Cited

U.S. PATENT DOCUMENTS

2016/0115068 A1* 4/2016 Nakatsu .................. C03B 33/04
83/880
2016/0362325 A1* 12/2016 Dong ................... B23K 26/359

FOREIGN PATENT DOCUMENTS

JP 2010-83015 4/2010
JP 2014051048 A * 3/2014
(Continued)

OTHER PUBLICATIONS

International Preliminary Report on Patentability dated Apr. 16, 2019 in International (PCT) Patent Application No. PCT/JP2017/036374.

(Continued)

*Primary Examiner* — Stephen Choi
(74) *Attorney, Agent, or Firm* — Wenderoth, Lind & Ponack, L.L.P.

(57) ABSTRACT

In a scribing operation, first through fourth auxiliary scribe lines are formed in a glass original sheet in addition to a main scribe line extending along a preset cutting line. A cutting operation includes a straight line portion cutting operation of cutting the glass original sheet along a first straight line portion of the main scribe line and the first and second auxiliary scribe lines, and cutting the glass original sheet along a second straight line portion of the main scribe line and the third and fourth auxiliary scribe lines, and a connection portion cutting operation of cutting the glass original sheet, which has been subjected to the straight line portion cutting operation, along a first connection portion of the main scribe line, and cutting the glass original sheet along a second connection portion of the main scribe line.

5 Claims, 8 Drawing Sheets

(56) References Cited

FOREIGN PATENT DOCUMENTS

| | | | |
|---|---|---|---|
| JP | 2014051415 A | * 3/2014 | |
| JP | 2015-10004 | 1/2015 | |
| WO | WO-2014208700 A1 | * 12/2014 | ............. B26D 3/085 |

OTHER PUBLICATIONS

International Search Report dated Dec. 19, 2017 in International (PCT) Application No. PCT/JP2017/036374.

* cited by examiner

000
METHOD FOR PRODUCING GLASS PLATE

TECHNICAL FIELD

The present invention relates to a manufacturing method for a glass sheet, which comprises: a scribing step of forming a main scribe line along a preset cutting line on a glass original sheet; and a cutting step of cutting the glass original sheet to obtain a glass sheet having an outer peripheral contour conforming to the preset cutting line.

BACKGROUND ART

A glass sheet is adopted as a cover glass for a display of, for example, a smartphone and a tablet PC. In some cases, an outer peripheral contour of the glass sheet to be used for such products is formed into a basic shape formed of a combination of straight lines and curved lines, for example, a rectangular shape illustrated in FIG. 5C described later, and four corner portions thereof are each formed into a shape formed of a circular arc-shaped curved line.

The glass sheet having the outer peripheral contour formed of the combination of the straight lines and the curved lines can be manufactured by cutting a glass original sheet, for example, in the following procedures.
(1) A main scribe line is formed along a preset cutting line on a glass sheet having an outer peripheral contour of a rectangular shape. For formation of the main scribe line, a scribe wheel is caused to travel while being pressed against a surface of the glass original sheet.
(2) A bending moment is caused to act on a periphery of the main scribe line to cut the glass original sheet along the main scribe line, thereby separating and removing an outer peripheral portion of the glass original sheet. With this, a glass sheet having an outer peripheral contour matching the preset cutting line is obtained.

In the cutting method described above, when the glass original sheet is cut, and the outer peripheral portion thereof is separated, the glass sheet to be obtained and the annular outer peripheral portion to be separated and removed are liable to interfere with each other. Such interference may cause, for example, cracks in the glass sheet to be obtained. In order to deal with such problem, in Patent Literature 1, there is proposed a method of forming, in addition to the main scribe line, auxiliary scribe lines in the glass original sheet.

FIGS. 5A to 5C are schematic views for illustrating the scribing method described in Patent Literature 1. FIG. 5A is an illustration of a state after formation of a main scribe line 91 and auxiliary scribe lines 92. FIG. 5B is an illustration of a state in which a part of an outer peripheral portion 93a is separated. FIG. 5C is an illustration of a glass sheet 95 to be obtained. In the scribing method described in Patent Literature 1, as illustrated in FIG. 5A, the auxiliary scribe lines 92 are formed so as to extend to straight line portions 91a of the straight main scribe line 91. In this case, the auxiliary scribe lines 92 are formed so as to be perpendicular to the straight line portions 91a of the main scribe line 91, or so as to be inclined at an inclination angle θ of from 15° to 85° with respect to the straight line portions 91a of the main scribe line 91.

When the auxiliary scribe lines 92 are formed in such a manner, an outer peripheral portion 93a to be separated and removed at the time of cutting the glass original sheet 93 is divided into a plurality of glass pieces 94 (see FIG. 5B). Therefore, occurrence of, for example, cracks in the glass sheet 95, which is to be obtained, through the interference with the glass pieces 94 can be reduced.

CITATION LIST

Patent Literature 1: JP 2015-10004 A

SUMMARY OF INVENTION

Technical Problem

However, with the scribing method described in Patent Literature 1, the glass sheet 95 to be obtained is liable to be damaged due to contact with the glass pieces 94 to be separated. This is because the plurality of glass pieces 94 having been divided have corner portions (portions surrounded by the dot lines, respectively, in FIG. 5B) formed between the main scribe line 91 and the auxiliary scribe lines 92. Such damage is liable to occur particularly in a course of cutting and separating a first glass piece 94 among the plurality of glass pieces 94 to be separated, as illustrated in FIG. 5B. This is because, when the first glass piece 94 is to be cut and separated, the outer peripheral portion 93a that is to be removed is present in the vicinity of the first glass piece 94.

Moreover, with the scribing method described in Patent Literature 1, a chip or a split is liable to be formed at each of portions of an outer peripheral contour 95a of the glass sheet 95, which is to be obtained, at which the auxiliary scribe lines 92 have been closely present (portions surrounded by the dot lines, respectively, in FIG. 5C). This is because the straight line portions 91a of the main scribe line 91 are cut in a plurality of times with the auxiliary scribe lines 92. Moreover, this is because the auxiliary scribe lines 92 are perpendicular to the main scribe line 91, or are inclined at the inclination angle of from 15° to 85° with respect to the straight line portions 91a of the main scribe line 91. Herein, the term "chip" refers to a lacked part with respect to the preset cutting line, and the term "split" refers to a surplus part with respect to the preset cutting line. Both the chip and the split are defects.

The present invention has been made in view of the circumstances described above, and has a main object to provide a manufacturing method for a glass sheet which is capable of suppressing damage due to contact at a time of separating an outer peripheral portion. Moreover, the present invention has another object to reduce a chip and a split at a time of cutting.

Solution to Problem

A manufacturing method for a glass sheet according to one embodiment of the present invention is as described below.

(1) A manufacturing method for a glass sheet comprises: a scribing step of forming a main scribe line along a preset cutting line on a glass original sheet; and a cutting step of cutting the glass original sheet along the preset cutting line to obtain a glass sheet having an outer peripheral contour conforming to the preset cutting line. The main scribe line comprises: a first straight line portion; a second straight line portion; a first connection portion, which connects one end point of the first straight line portion and one end point of the second straight line portion to each other, and comprises a curved line; and a second connection portion, which connects another end point of the first straight line portion and another end point of the second straight line portion to each other.

In the scribing step, a first auxiliary scribe line, a second auxiliary scribe line, a third auxiliary scribe line, and a fourth auxiliary scribe line are formed in addition to the main scribe line. The first auxiliary scribe line is located on a straight line extended from the one end point of the first straight line portion along the first straight line portion, and the second auxiliary scribe line is located on a straight line extended from the another end point of the first straight line portion along the first straight line portion. The third auxiliary scribe line is located on a straight line extended from the one end point of the second straight line portion along the second straight line portion, and the fourth auxiliary scribe line is located on a straight line extended from the another end point of the second straight line portion along the second straight line portion.

The cutting step comprises: a straight line portion cutting step of cutting the glass original sheet along the first straight line portion, the first auxiliary scribe line, and the second auxiliary scribe line, and cutting the glass original sheet along the second straight line portion, the third auxiliary scribe line, and the fourth auxiliary scribe line; and a connection portion cutting step of cutting the glass original sheet, which has been subjected to the straight line portion cutting step, along the first connection portion, and cutting the glass original sheet along the second connection portion.

(2) In the manufacturing method for a glass sheet according to the above-mentioned item (1), the first auxiliary scribe line and the second auxiliary scribe line are spaced apart from the first straight line portion, and the third auxiliary scribe line and the fourth auxiliary scribe line are spaced apart from the second straight line portion.

(3) In the manufacturing method for a glass sheet according to the above-mentioned item (1) or (2), the scribing step comprises: forming the first auxiliary scribe line in the glass original sheet; forming the main scribe line in the glass original sheet, which has the first auxiliary scribe line formed therein, with one point on the first straight line portion as a starting point; forming the second auxiliary scribe line in the glass original sheet, which has the main scribe line formed therein; and forming the third auxiliary scribe line and the fourth auxiliary scribe line in the glass original sheet, which has the second auxiliary scribe line formed therein.

(4) In the manufacturing method for a glass sheet according to any one of the above-mentioned items (1) to (3), the second connection portion comprises a curved line.

(5) In the manufacturing method for a glass sheet according to any one of the above-mentioned items (1) to (4), the first connection portion comprises: a linear first intermediate portion; an arc-shaped first end portion which connects the one end point of the first straight line portion and one end point of the first intermediate portion to each other; and an arc-shaped second end portion which connects the one end point of the second straight line portion and another end point of the first intermediate portion to each other, and the second connection portion comprises: a linear second intermediate portion; an arc-shaped third end portion which connects the another end point of the first straight line portion and one end point of the second intermediate portion to each other; and an arc-shaped fourth end portion which connects the another end point of the second straight line portion and another end point of the second intermediate portion to each other.

Advantageous Effects of Invention

In the manufacturing method for a glass sheet according to one embodiment of the present invention, the glass original sheet is cut along the first straight line portion of the main scribe line and along the first auxiliary scribe line and the second auxiliary scribe line which are formed on extensions of the first straight line portion. Moreover, the glass original sheet is cut along the second straight line portion of the main scribe line and along the third auxiliary scribe line and the fourth auxiliary scribe line which are formed on extensions of the second straight line portion. After that, the glass original sheet is cut along a first connection portion of the main scribe line, and is cut along a second connection portion of the main scribe line. With this, damage due to contact at the time of separating the outer peripheral portion can be suppressed.

BRIEF DESCRIPTION OF DRAWINGS

FIG. 1A is an illustration of a state before a scribing step. FIG. 1B is an illustration of a state after the scribing step. FIG. 1C is an illustration of a state after a straight line portion cutting step. FIG. 1D is an illustration of a state after a connection portion cutting step.

FIG. 2A is an illustration of a state after formation of a first auxiliary scribe line. FIG. 2B is an illustration of a state after formation of a main scribe line. FIG. 2C is an illustration of a state after formation of a second auxiliary scribe line. FIG. 2D is an illustration of a state after formation of a third auxiliary scribe line and a fourth auxiliary scribe line.

FIG. 3A is an illustration of a shape in which two corner portions are each formed of a circular arc-shaped curved line. FIG. 3B is an illustration of a shape in which one corner portion is formed of a circular arc-shaped curved line.

FIG. 4A is an illustration of a substantially trapezoidal shape. FIG. 4B is an illustration of a substantially parallelogram shape. FIG. 4C is an illustration of a shape in which the first connection portion and the second connection portion are each formed only of a curved line.

FIG. 5A is an illustration of a state after formation of a main scribe line and auxiliary scribe lines. FIG. 5B is an illustration of a state in which a part of an outer peripheral portion is separated. FIG. 5C is an illustration of a glass sheet to be obtained.

DESCRIPTION OF EMBODIMENTS

Now, a manufacturing method for a glass sheet according to one embodiment of the present invention (hereinafter referred to as "the manufacturing method according to the embodiment") is described with reference to the drawings.

Figure 1A:
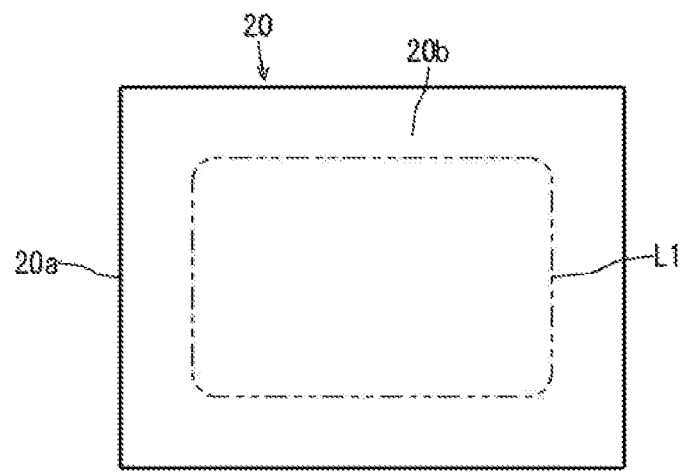
FIGS. 1A to 1D are plan views for schematically illustrating an outline of a manufacturing method according to an embodiment of the present invention.
Figure 1B:
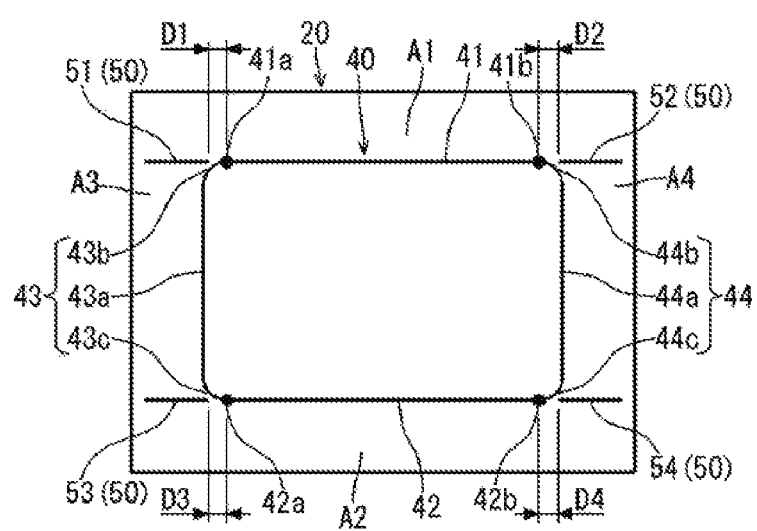
Figure 1C:
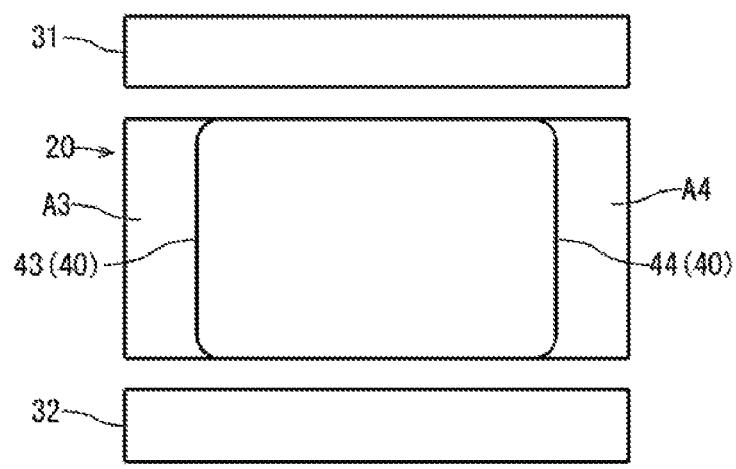
Figure 1D:
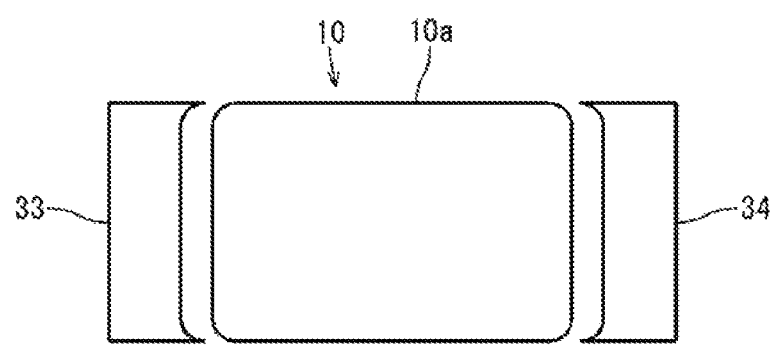

FIGS. 1A to 1D are plan views for schematically illustrating an outline of the manufacturing method according to the embodiment. FIG. 1A is an illustration of a state before a scribing step. FIG. 1B is an illustration of a state after the scribing step. FIG. 1C is an illustration of a state after a straight line portion cutting step. FIG. 1D is an illustration of a state after a connection portion cutting step.

Before manufacture of a glass sheet 10, a glass original sheet 20 as illustrated in FIG. 1A is prepared. The glass original sheet 20 has an outer peripheral contour 20a of a rectangular shape. The manufacturing method according to the embodiment comprises the scribing step and the cutting step. In the scribing step, in addition to a main scribe line 40 extending along a preset cutting line L1, auxiliary scribe lines 50 are formed in the glass original sheet 20 (see FIG. 1B). In the present invention, as indicated by the reference symbol L1 in FIG. 1A, the preset cutting line is an imaginary line which is located along a part to be cut on the glass original sheet 20.

The main scribe line 40 has a shape of a closed loop, and comprises a first straight line portion 41, a second straight line portion 42, a first connection portion 43, and a second connection portion 44. The first connection portion 43 connects one end point 41a of the first straight line portion 41 and one end point 42a of the second straight line portion 42 to each other, and comprises curved lines. More specifically, the first connection portion 43 comprises a linear first intermediate portion 43a, an arc-shaped first end portion 43b, and an arc-shaped second end portion 43c. The first end portion 43b connects the one end point 41a of the first straight line portion 41 and one end point of the first intermediate portion 43a to each other. Moreover, the second end portion 43c connects the one end point 42a of the second straight line portion 42 and another end point of the first intermediate portion 43a to each other.

The second connection portion 44 connects another end point 41b of the first straight line portion 41 and another end point 42b of the second straight line portion 42 to each other, and comprises curved lines. More specifically, the second connection portion 44 comprises a linear second intermediate portion 44a, an arc-shaped third end portion 44b, and an arc-shaped fourth end portion 44c. The third end portion 44b connects the another end point 41b of the first straight line portion 41 and one end point of the second intermediate portion 44a to each other. The fourth end portion 44c connects the another end point 42b of the second straight line portion 42 and another end point of the second intermediate portion 44a to each other.

The auxiliary scribe line 50 comprises a first auxiliary scribe line 51, a second auxiliary scribe line 52, a third auxiliary scribe line 53, and a fourth auxiliary scribe line 54. In the following description, the auxiliary scribe line is also referred to as "auxiliary line", and the first auxiliary scribe line, the second auxiliary scribe line, the third auxiliary scribe line, and the fourth auxiliary scribe lines are also referred to as "first auxiliary line", "second auxiliary line", "third auxiliary line", and "fourth auxiliary line", respectively.

The first auxiliary line 51 is located on a straight line extended from the one end point 41a of the first straight line portion 41 along the first straight line portion 41. Moreover, the second auxiliary line 52 is located on a straight line extended from the another end point 41b of the first straight line portion 41 along the first straight line portion 41. Such first auxiliary line 51 and second auxiliary line 52 are located on both sides of the first straight line portion 41. The first straight line portion 41, the first auxiliary line 51, and the second auxiliary line 52 form a linear scribe line extending across the entirety of the glass original sheet 20.

The third auxiliary line 53 is located on a straight line extended from the one end point 42a of the second straight line portion 42 along the second straight line portion 42. Moreover, the fourth auxiliary line 54 is located on a straight line extended from the another end point 42b of the second straight line portion 42 along the second straight line portion 42. Such third auxiliary line 53 and fourth auxiliary line 54 are located on both sides of the second straight line portion 42. The second straight line portion 42, the third auxiliary line 53, and the fourth auxiliary line 54 form a linear scribe line extending across the entirety of the glass original sheet 20.

In the subsequent cutting step, the glass original sheet 20 is cut through use of the main scribe line 40 and the auxiliary lines 50. With this, an outer peripheral portion 20b of the glass original sheet 20 is separated and removed, and hence the glass sheet 10 having an outer peripheral contour 10a conforming to the preset cutting line L1 is obtained (see FIG. 1D). Moreover, the outer peripheral portion 20b of the glass original sheet 20 is divided into regions A1 to A4 by the auxiliary lines 50. Thus, the glass original sheet 20 is separated while being formed into four glass pieces 31 to 34. Such cutting step comprises the straight line portion cutting step and the connection portion cutting step.

In the straight line portion cutting step, a bending moment is applied to the glass original sheet 20 having the main scribe line 40 and the auxiliary lines 50 formed therein (see FIG. 1B), thereby cutting the glass original sheet 20 along the first straight line portion 41, the first auxiliary line 51, and the second auxiliary line 52. With this, the region A1 of the outer peripheral portion of the glass original sheet 20 is separated and is formed into the glass piece 31. In addition, the glass original sheet 20 is cut along the second straight line portion 42, the third auxiliary line 53, and the fourth auxiliary line 54. With this, the region A2 of the outer peripheral portion of the glass original sheet 20 is separated and is formed into the glass piece 32. The order of cutting is not particularly limited.

In the connection portion cutting step, a bending moment is applied to the glass original sheet 20 having been subjected to the straight line portion cutting step (see FIG. 1C), thereby cutting the glass original sheet 20 along the first connection portion 43 of the main scribe line 40. With this, the region A3 of the outer peripheral portion of the glass original sheet 20 is separated and is formed into the glass piece 33. In addition, the glass original sheet 20 is cut along the second connection portion 44 of the main scribe line 40. With this, the region A4 of the outer peripheral portion of the glass original sheet 20 is separated and is formed into the glass piece 34. The order of cutting is not particularly limited. As a result, the glass sheet 10 as illustrated in FIG. 1D is obtained, and the outer peripheral contour 10a of the glass sheet 10 matches the preset cutting line L1.

In the manufacturing method according to the embodiment described above, the auxiliary lines 50 are arranged on the same straight line as the first straight line portion 41 or the second straight line portion 42 of the main scribe line 40. Thus, unlike the scribing method of Patent Literature 1, the auxiliary lines 50 and the first straight line portion 41 or the second straight line portion 42 of the main scribe line 40 do not form an angle. Therefore, with the manufacturing method according to the embodiment, when the glass pieces 31 and 32 are separated in the straight line portion cutting step, damage to the glass sheet 10 to be obtained can be suppressed. Moreover, formation of a chip or a split can be reduced at each of portions of the outer peripheral contour of the glass sheet (finished product), which is to be obtained, at which the auxiliary lines have been closely present.

Moreover, the regions A1 and A2 of the outer peripheral portion are removed as the glass pieces 31 and 32 in the straight line portion cutting step, and hence the regions A3 and A4 of the outer peripheral portion can easily be separated and removed as the glass pieces 33 and 34 in the connection portion cutting step. Thus, contact with the glass sheet 10 at the time of separating the glass pieces 33 and 34 in the connection portion cutting step can be reduced. Also with this, damage to the glass sheet 10 to be obtained can be suppressed.

In the manufacturing method according to the embodiment, in the straight line portion cutting step, cutting is performed through use of the first straight portion 41 of the main scribe line 40, and cutting is performed through use of the second straight line portion 42 of the main scribe line 40. In the subsequent connection portion cutting step, cutting is performed through use of the first connection portion 43, and cutting is performed through use of the second connection portion 44. As described above, the first straight line portion 41, the second straight line portion 42, the first connection portion 43, and the second connection portion 44 are each cut in one time. Also with this, formation of the chip or the split can be reduced.

The first auxiliary line 51 illustrated in FIG. 1B is spaced apart from the first straight line portion 41, and a gap is defined between the first auxiliary line 51 and the first straight line portion 41. In the manufacturing method according to the embodiment, the first auxiliary line 51 may extend to the first straight line portion 41 to be connected to the first straight line portion 41. However, when the first auxiliary line 51 is connected to the first straight line portion 41, the scribe lines are closely arranged around the one end point 41a of the first straight line portion 41. Thus, there is a fear in that the chip or the split is formed. In order to prevent the formation of the chip or the split, it is preferred that the first auxiliary line 51 be spaced apart from the first straight line portion 41.

Similarly, the second auxiliary line 52 may be connected to the first straight line portion 41, but it is preferred that the second auxiliary line 52 be spaced apart from the first straight line portion 41. Moreover, the third auxiliary line 53 may be connected to the second straight line portion 42, but it is preferred that the third auxiliary line 53 be spaced apart from the second straight line portion 42. The fourth auxiliary line 54 may be connected to the second straight line portion 42, but it is preferred that the fourth auxiliary line 54 be spaced apart from the second straight line portion 42.

In the case in which the first auxiliary line 51 is spaced apart from the first straight line portion 41, when a spacing distance D1 (mm) between the first auxiliary line 51 and the first straight line portion 41 is excessively large, cracks may advance in an unintended direction. As a result, there is a fear in that a small chip is formed around one end point of the first straight line portion 41. Such small chip can be eliminated by end-surface polishing in a later step. However, it is desired that a margin for polishing be reduced by preventing formation of the small chip.

The spacing distance D1 (mm) which is capable of preventing formation of the small chip changes depending on a thickness "t" of the glass original sheet 20. Thus, the spacing distance D1 (mm, see FIG. 1B) may suitably be set in accordance with the thickness "t" of the glass original sheet 20. For example, in a case in which the thickness "t" of the glass original sheet 20 is 1.1 mm, when the spacing distance D1 (mm) is set to 5 mm, a small chip may be formed. Meanwhile, in a case in which the thickness "t" of the glass original sheet 20 is 0.3 mm, even when the spacing distance D1 (mm) is set to 15 mm, formation of the small chip can be prevented. Therefore, when the spacing distance D1 (mm) between the first auxiliary line 51 and the first straight line portion 41 is set to be equal to or smaller than (6/t−1), formation of the small chip can be prevented.

Meanwhile, as long as the first auxiliary line 51 is not connected to the first straight line portion 41, the chip or the split can be prevented even when the spacing distance D1 (mm) is small. Therefore, a lower limit of the spacing distance D1 (mm) is not determined, but the lower limit of the spacing distance D1 is equal to or larger than 1 mm when the scribe lines are formed through use of the scribe wheel.

Similarly, formation of the small chip can be prevented when a spacing distance D2 (mm) between the second auxiliary line 52 and the first straight line portion 41, a spacing distance D3 (mm) between the third auxiliary line 53 and the second straight line portion 42, and a spacing distance D4 (mm) between the fourth auxiliary line 54 and the second straight line portion 42 are also set to be equal to or smaller than (6/t−1). The lower limits of the spacing distances D2, D3, and D4 are also the same as the lower limit of the spacing distance D1.

The auxiliary lines 50 illustrated in FIG. 1B are spaced apart from the outer peripheral contour 20a of the glass original sheet 20. However, the auxiliary lines 50 may extend to the outer peripheral contour 20a of the glass original sheet 20. In view of reducing the manufacturing cost by protecting a tip of the scribe wheel, it is preferred that the auxiliary lines 50 be spaced apart from the outer peripheral contour 20a of the glass original sheet 20. When the auxiliary lines 50 are to be spaced apart from the outer peripheral contour 20a of the glass original sheet 20, it is preferred that the auxiliary lines 50 extend to the vicinity of the outer peripheral contour 20a of the glass original sheet 20.

The order of forming the scribe lines (main scribe line 40 and auxiliary lines 50) in the scribing step is not particularly limited. For example, the auxiliary lines 50 may be formed after the main scribe line 40 is formed. In view of improving manufacture efficiency by reducing a moving distance of the scribe wheel, as described later with reference to FIGS. 2A to 2D, it is preferred that the scribe lines be formed in the following manner. Specifically, after the first auxiliary line 51 is formed, the main scribe line 40 is formed. After that, the second auxiliary line 52 is formed. Finally, the third auxiliary line 53 and the fourth auxiliary line 54 are formed. In this case, at the time of forming the main scribe line 40, it is preferred that one point on the first straight line portion 41 be set as a starting point.

Figure 2A:
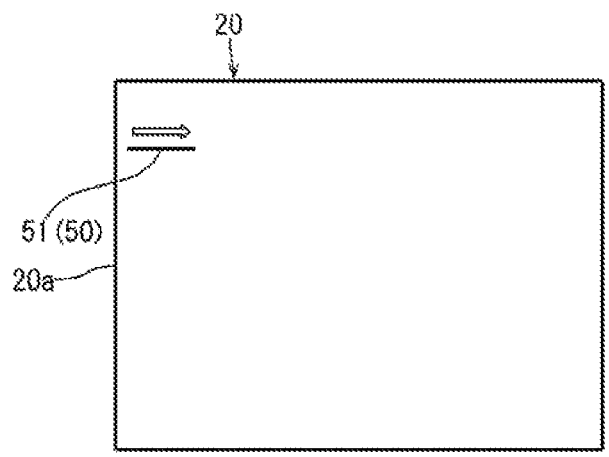
FIGS. 2A to 2D are plan views for schematically illustrating an exemplary order of forming scribe lines.
Figure 2B:
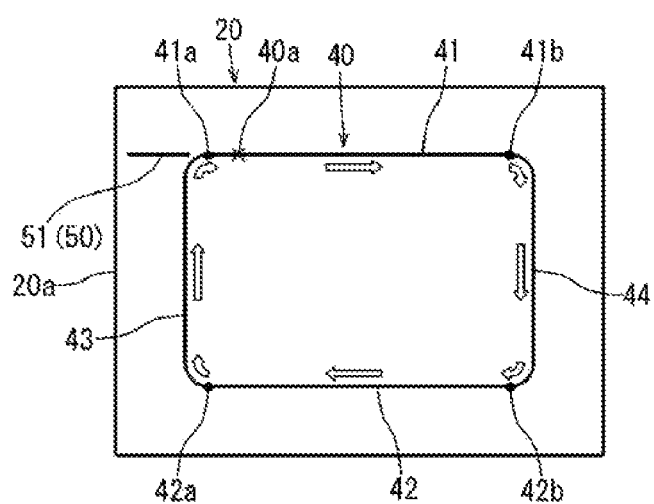
Figure 2C:
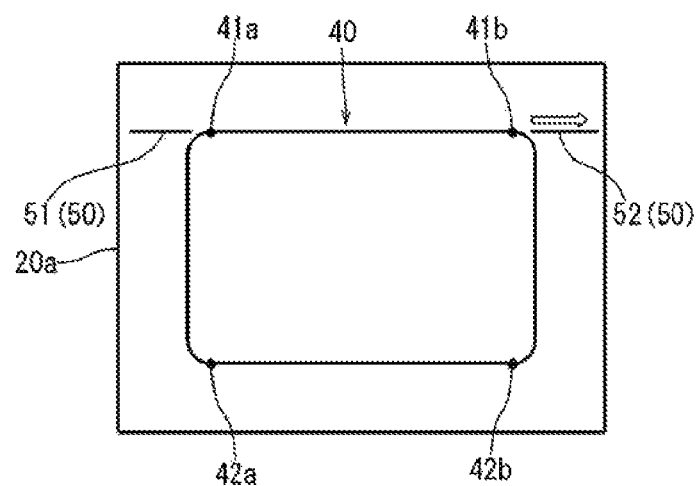
Figure 2D:
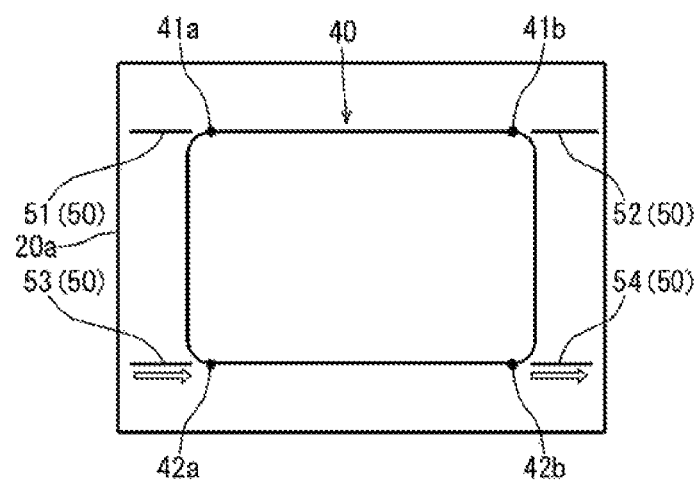

FIGS. 2A to 2D are plan views for schematically illustrating an exemplary order of forming the scribe lines. FIG. 2A is an illustration of a state after formation of the first auxiliary line 51. FIG. 2B is an illustration of a state after formation of the main scribe line 40. FIG. 2C is an illustration of a state after formation of the second auxiliary line 52. FIG. 2D is an illustration of a state after formation of the third auxiliary line 53 and the fourth auxiliary line 54. In FIGS. 2A to 2D, the directions of forming the scribe lines, that is, the directions of travelling of the scribe wheel are indicated by outlined arrows.

First, as illustrated in FIG. 2A, the first auxiliary line 51 is formed along a direction of extending from the outer peripheral contour 20a side of the glass original sheet 20 toward the one end point 41a of the first straight line portion 41. Next, as illustrated in FIG. 2B, with the one point 40a on the first straight line portion 41 set as a starting point and an endpoint, the main scribe line 40 having a shape of a closed loop is formed. After that, as illustrated in FIG. 2C, the second auxiliary line 52 is formed along a direction of extending from the another end point 41b side of the first straight line portion 41 toward the outer peripheral contour 20a of the glass original sheet 20. Finally, as illustrated in FIG. 2D, the third auxiliary line 53 is formed along a direction of extending from the outer periphery contour 20a side of the glass original sheet 20 toward the one end point 42a of the second straight line portion 42, and after that, the fourth auxiliary line 54 is formed along a direction of extending from the another end point 42b side of the second straight line portion 42 toward the outer peripheral contour 20a of the glass original sheet 20. Alternatively, the fourth auxiliary line 54 is formed along a direction of extending from the outer peripheral contour 20a side of the glass original sheet 20 toward the another end point 42b of the second straight line portion 42, and after that, the third auxiliary line 53 is formed along a direction of extending from the one end point 42a side of the second straight line portion 42 toward the outer peripheral contour 20a of the glass original sheet 20.

The main scribe line 40 illustrated in FIG. 1B has a rectangular shape as a basic shape, and four corner portions thereof are each formed of a circular arc-shaped curved line (hereinafter referred to as "substantially rectangular shape"). In this case, the manufacturing method according to the embodiment is not limited to the mode in which, as illustrated in FIGS. 1A to 1D, a pair of long sides correspond to the first straight line portion 41 and the second straight line portion 42 of the main scribe line 40. A mode in which a pair of short sides correspond to the first straight line portion 41 and the second straight line portion 42 of the main scribe line 40 may be adopted. The main scribe line 40 is not limited to the substantially rectangular shape, and any other shape may be adopted.

Figure 3A:
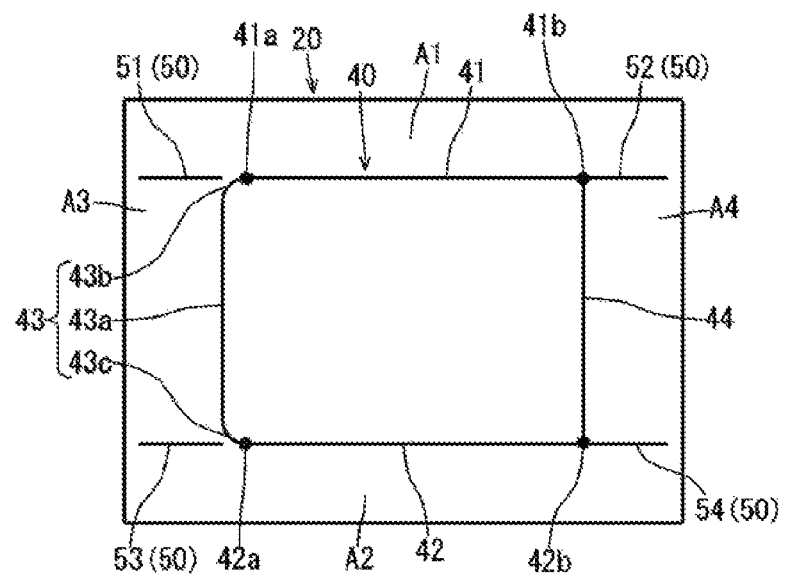
FIGS. 3A and 3B are plan views for schematically illustrating modification examples of a main scribe line having a rectangular shape as a basic shape.
Figure 3B:
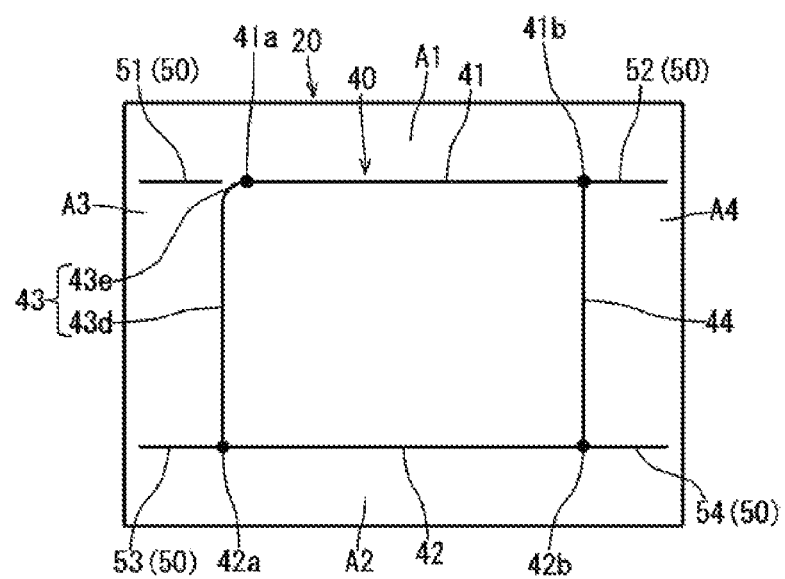

FIGS. 3A and 3B are plan views for schematically illustrating modification examples of the main scribe line having a rectangular shape as a basic shape. FIG. 3A is an illustration of a shape in which two corner portions are each formed of a circular arc-shaped curved line. FIG. 3B is an illustration of a shape in which one corner portion is formed of a circular arc-shaped curved line. Although not illustrated in the drawings, the main scribe line 40 having a rectangular shape as a basic shape may have a shape in which three corner portions are each formed of a circular arc-shaped curved line.

In the main scribe line 40 illustrated in FIG. 3A, the first connection portion 43 comprises the linear first intermediate portion 43a, the arc-shaped first end portion 43b, and the arc-shaped second end portion 43c, and the second connection portion 44 comprises only a straight line. In this case, in the scribing step, four scribe lines are formed. The first scribe line comprises the first auxiliary line 51. Moreover, the second scribe line comprises the third auxiliary line 53. The third scribe line comprises the second connection portion 44. The fourth scribe line comprises the second auxiliary line 52, the first straight line portion 41, the first connection portion 43, the second straight line portion 42, and the fourth auxiliary line 54. In the scribing step, the order of forming the four scribe lines is not particularly limited. Moreover, an end portion of the third scribe line forming the second connection portion 44 may extend beyond the first straight line portion 41 and the second straight line portion 42, that is, the third scribe line may be longer than the second connection portion 44.

In the main scribe line 40 illustrated in FIG. 3B, the first connection portion 43 comprises a straight line portion 43d and an arc-shaped portion 43e, and the second connection portion 44 comprises only a straight line. In this case, in the scribing step, four scribe lines are formed. The first scribe line comprises the first auxiliary line 51. Moreover, the second scribe line comprises the third auxiliary line 53, the second straight line portion 42, and the fourth auxiliary line 54. The third scribe line comprises the second connection portion 44 of the main scribe line 40. The fourth scribe line comprises the second auxiliary line 52, the first straight line portion 41, and the first connection portion 43. In the scribing step, the order of forming the four scribe lines is not particularly limited. Moreover, an end portion of the third scribe line forming the second connection portion 44 may extend beyond the first straight line portion 41 and the second straight line portion 42, and an end portion of the fourth scribe line comprising the first connection portion 43 may extend beyond the second straight line portion 42.

As described above, in the manufacturing method according to the embodiment, it is not always required that the second connection portion 44 comprise a curved line as long as the first connection portion 43 comprises at least one curved line. Moreover, a part of the main scribe line 40 and a part of each auxiliary line 50 may be connected to each other and formed so as to be continuous with each other.

Figure 4A:
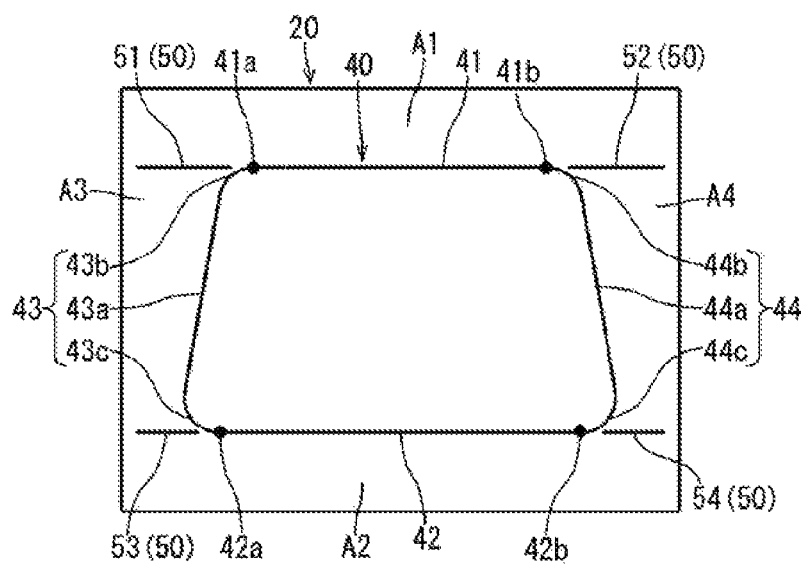
FIGS. 4A to 4C are plan views for schematically illustrating examples of a shape of the main scribe line which can be adopted in the manufacturing method according to the embodiment.
Figure 4B:
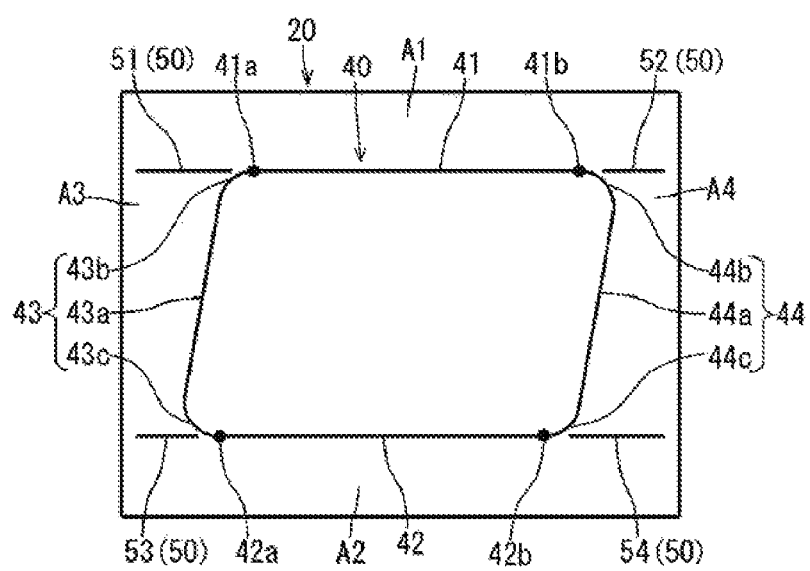
Figure 4C:
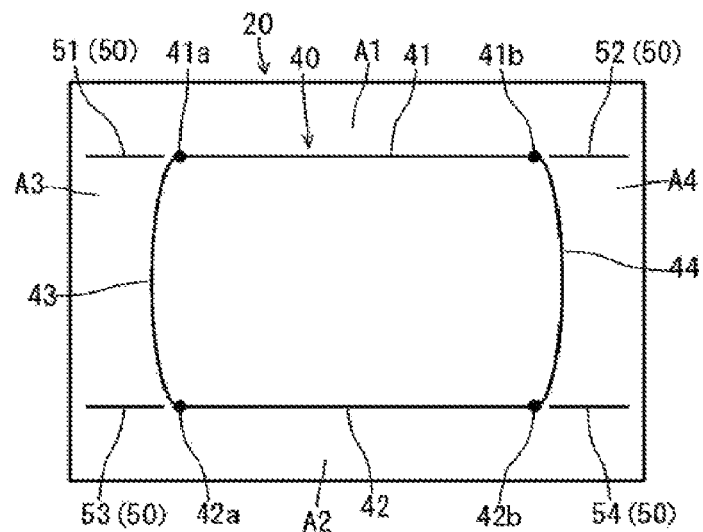
Figure 5A:
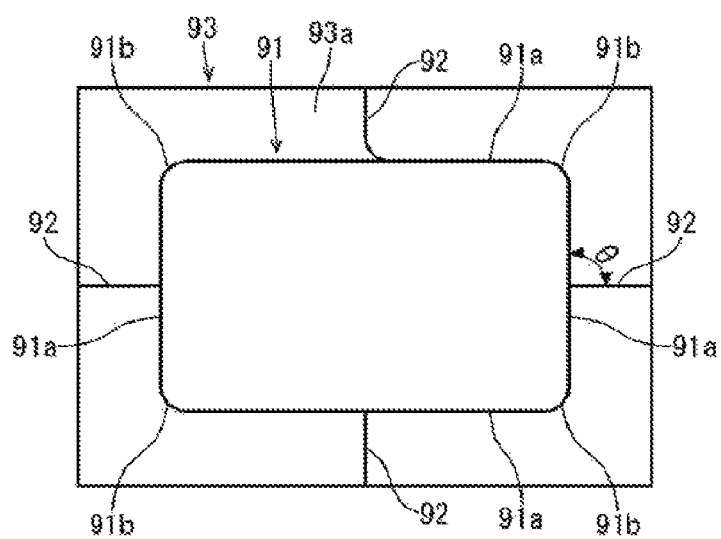
FIGS. 5A to 5C are schematic views for illustrating a scribing method described in Patent Literature 1.
Figure 5B:
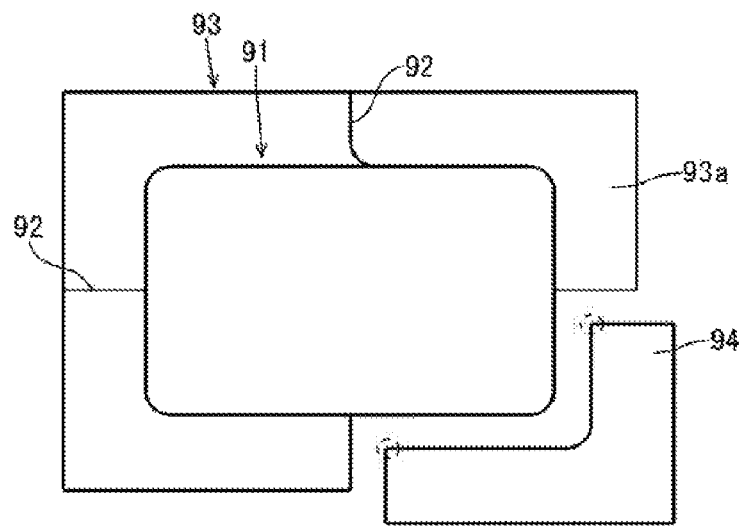
Figure 5C:
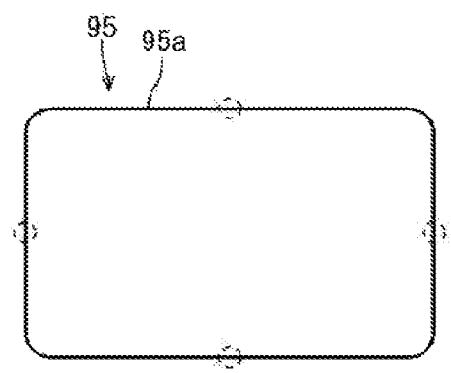

FIGS. 4A to 4C are plan views for schematically illustrating examples of a shape of the main scribe line which can be adopted in the manufacturing method according to the embodiment. FIG. 4A is an illustration of a substantially trapezoidal shape. FIG. 4B is an illustration of a substantially parallelogram shape. FIG. 4C is an illustration of a shape in which the first connection portion 43 and the second connection portion 44 are each formed only of a curved line.

The main scribe line 40 may adopt a shape having a trapezoidal shape as a basic shape as illustrated in FIG. 4A with four corner portions thereof each formed of a circular arc-shaped curved line (substantially trapezoidal shape). Moreover, the main scribe line 40 may adopt a shape having a parallelogram shape as a basic shape as illustrated in FIG. 4B with four corner portions thereof each formed of a circular arc-shaped curved line (substantially parallelogram shape).

When the substantially trapezoidal shape or the substantially parallelogram shape is adopted, similarly to the substantially rectangular shape, the first connection portion 43 comprises the linear first intermediate portion 43a, the arc-shaped first end portion 43b, and the arc-shaped second end portion 43c, and the second connection portion 44 comprises the linear second intermediate portion 44a, the arc-shaped third end portion 44b, and the arc-shaped fourth end portion 44c.

The manufacturing method according to the embodiment may also adopt the main scribe line 40 in which, as illustrated in FIG. 4C, the first connection portion 43 and the second connection portion 44 are each formed only of a curved line.

The glass original sheet 20 before being subjected to a chemical strengthening treatment requires a larger bending moment for cutting than the glass original sheet 20 after being subjected to the chemical strengthening treatment. Therefore, when the glass original sheet 20 before being subjected to the chemical strengthening treatment is to be cut, damage due to contact at the time of separating the outer peripheral portion 20b is liable to occur, and the chip and the split are liable to be formed. Thus, when the manufacturing method according to the embodiment is applied to the glass original sheet 20 before being subjected to the chemical strengthening treatment, the effect of suppressing the damage due to contact at the time of separating the outer peripheral portion 20b and the effect of reducing the chip and the split at the time of cutting become more conspicuous. Therefore, it is preferred that the scribing step and the cutting step be performed on the glass original sheet 20 before being subjected to the chemical strengthening treatment. In other words, it is preferred that the manufacturing method according to the embodiment comprises a strengthening step of performing the chemical strengthening treatment on the glass sheet 10 obtained by the cutting step.

REFERENCE SIGNS LIST 10 glass sheet
10a outer peripheral contour
20 glass original sheet
20a outer peripheral contour
20b outer peripheral portion
31 to 34 glass piece
40 main scribe line
40a starting point and endpoint
41 first straight line portion
41a one end point
41b another end point
42 second straight line portion
42a one end point
42b another end point
43 first connection portion
43a first intermediate portion
43b first end portion
43c second end portion
44 second connection portion
44a second intermediate portion
44b third end portion
44c fourth end portion
50 auxiliary scribe line (auxiliary line)
51 first auxiliary scribe line (first auxiliary line)
52 second auxiliary scribe line (second auxiliary line)
53 third auxiliary scribe line (third auxiliary line)
54 fourth auxiliary scribe line (fourth auxiliary line)
91 main scribe line
91a straight line portion
91b curved line portion
92 auxiliary line in related art
93 glass original sheet
93a outer peripheral portion
94 glass piece
95 glass sheet
95a outer peripheral contour
A1 to A4 region of outer peripheral portion
L1 preset cutting line

The invention claimed is:

1. A manufacturing method for a glass sheet, the manufacturing method comprising:
a scribing step of forming a main scribe line along a preset cutting line on a glass original sheet, and forming a first auxiliary scribe line, a second auxiliary scribe line, a third auxiliary scribe line, and a fourth auxiliary scribe line on the glass original sheet; and
a cutting step of cutting the glass original sheet along the preset cutting line to obtain a glass sheet having an outer peripheral contour conforming to the preset cutting line,
wherein the main scribe line comprises:
a first straight line portion;
a second straight line portion;
a first connection portion, which connects one end point of the first straight line portion and one end point of the second straight line portion to each other, and comprises a curved line; and
a second connection portion, which connects another end point of the first straight line portion and another end point of the second straight line portion to each other,
wherein the first auxiliary scribe line is located on a straight line extended from the one end point of the first straight line portion along the first straight line portion,
wherein the second auxiliary scribe line is located on a straight line extended from the another end point of the first straight line portion along the first straight line portion,
wherein the third auxiliary scribe line is located on a straight line extended from the one end point of the second straight line portion along the second straight line portion,
wherein the fourth auxiliary scribe line is located on a straight line extended from the another end point of the second straight line portion along the second straight line portion,
wherein the first auxiliary scribe line, the second auxiliary scribe line and the first straight line portion are arranged on a same straight line,
wherein the third auxiliary scribe line, the fourth auxiliary scribe line and the second straight line portion are arranged on a same straight line, and
wherein the cutting step comprises:
a straight line portion cutting step of cutting the glass original sheet along the first straight line portion, the first auxiliary scribe line, and the second auxiliary scribe line by a single break cutting, and cutting the glass original sheet along the second straight line portion, the third auxiliary scribe line, and the fourth auxiliary scribe line by a single break cutting; and
a connection portion cutting step of cutting the glass original sheet, which has been subjected to the straight line portion cutting step, along the first connection portion, and cutting the glass original sheet along the second connection portion.

2. The manufacturing method for a glass sheet according to claim 1,
wherein the first auxiliary scribe line and the second auxiliary scribe line are spaced apart from the first straight line portion, and
wherein the third auxiliary scribe line and the fourth auxiliary scribe line are spaced apart from the second straight line portion.

3. The manufacturing method for a glass sheet according to claim 1, wherein the scribing step comprises:
forming the first auxiliary scribe line in the glass original sheet;
forming the main scribe line in the glass original sheet, which has the first auxiliary scribe line formed therein, with one point on the first straight line portion as a starting point;
forming the second auxiliary scribe line in the glass original sheet, which has the main scribe line formed therein; and
forming the third auxiliary scribe line and the fourth auxiliary scribe line in the glass original sheet, which has the second auxiliary scribe line formed therein.

4. The manufacturing method for a glass sheet according to claim 1, wherein the second connection portion comprises a curved line.

5. The manufacturing method for a glass sheet according to claim 1,
wherein the first connection portion comprises:
- a linear first intermediate portion;
- an arc-shaped first end portion which connects the one end point of the first straight line portion and one end point of the linear first intermediate portion to each other; and
- an arc-shaped second end portion which connects the one end point of the second straight line portion and another end point of the linear first intermediate portion to each other, and wherein the second connection portion comprises:
- a linear second intermediate portion;
- an arc-shaped third end portion which connects the another end point of the first straight line portion and one end point of the linear second intermediate portion to each other; and
- an arc-shaped fourth end portion which connects the another end point of the second straight line portion and another end point of the linear second intermediate portion to each other.

* * * * *